United States Patent Office 3,350,391
Patented Oct. 31, 1967

3,350,391
NOVEL MORPHANTHRIDONE OXIMES
Alexander E. Drukker, Milwaukee, and Claude I. Judd, Mequon, Wis., assignors to Colgate-Palmolive Company, New York, N.Y., a corporation of Delaware
No Drawing. Filed Feb. 8, 1965, Ser. No. 431,212
4 Claims. (Cl. 260—239)

ABSTRACT OF THE DISCLOSURE

The compounds are 5-acyl-5,6-dihydro-11-morphanthridone oximes, useful as anti-hypertensive agents. A species disclosed is 5 - acetyl - 5,6 - dihydro - 11 - morphanthridone oxime.

---

This invention relates to novel morphanthridone derivatives and processes of preparing such derivatives. More particularly, this invention is concerned with novel 5,6-dihydro-11-morphanthridone oximes, processes of producing these compounds and pharmacologic and theraupeutic uses for such compounds.

The novel 5,6 - dihydro - 11 - morphanthridone oximes of this invention have the formula

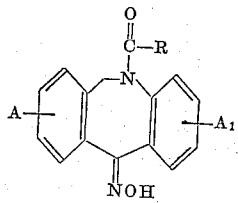

wherein A and $A_1$ are hydrogen, a halo group such as the chloro and bromo groups, a lower alkoxy such as methoxy and ethoxy, a lower alkyl such as methyl and butyl, a lower alkyl-thio such as thiomethyl and thioethyl and trifluoromethyl; and R is a lower alkyl such as methyl or butyl, an aryl such as phenyl, and aralkyl such as benzyl, an O-lower alkyl such as methoxy or an S-lower alkyl such as thiomethyl.

The compounds of Formula 1 may be prepared by reacting a 5 - acyl - 5,6 - dihydro - 11 - morphanthridone with hydroxylamine. The novel process of the present invention may be represented as follows:

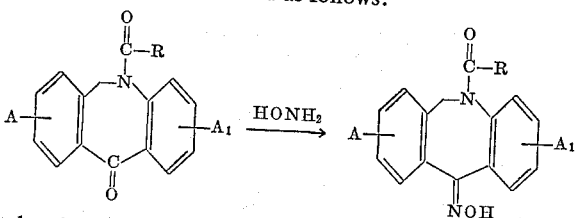

wherein A, $A_1$ and R have their assigned value.

The 5-acyl-5,6-dihydro-11-morphanthridones which are employed in the inventive process may be prepared by acylating a 5,6-dihydromorphanthridine to form the corresponding 5-acyl derivative and then oxidizing it to form the 5-acyl-5,6-dihydro-11-morphanthridone.

The acylation of the 5,6-dihydromorphanthridine to yield the 5-acyl-5,6-dihydromorphanthridine can be readily effected by conventional means such as by treatment with an acyl halide, anhydride or ester. In the preferred practice of the process the 5,6-dihydromorphanthridine is dissolved in a suitable solvent such as benzene, toluene or xylene and the reactants are heated, preferably at reflux temperature. The reaction usually is substantially completed in about one to four hours at which time the reaction mixture is cooled, neutralized and the desired product isolated by conventional procedures.

Examples of some of the acylating agents which may be employed in this reaction are:

Acetyl chloride,
Acetyl bromide,
Propionyl chloride,
n-Butyryl chloride,
Benzoyl chloride,
Acetic anhydride,
Propionic anhydride,
Ethyl formate,
Benzyl formate,
Ethyl chlorocarbonate, and
Butyl chlorothiocarbonate.

Examples of some of the 5-acyl-5,6-dihydromorphanthridnes thus prepared are:

5-acetyl-5,6-dihydromorphanthridine,
2-chloro-5-acetyl-5,6-dihydromorphanthridine,
5-propionyl-5,6-dihydromorphanthridine,
2-trifluoromethyl-5-propionyl-5,6-dihydromorphanthridine,
5-n-butyryl-5,6-dihydromorphanthridine,
3-methyl-5-butyryl-5,6-dihydromorphanthridine
5-isobutyryl-5,6-dihydromorphanthridine,
5-benzoyl-5,6-dihydromorphanthridine,
5-carbethoxy-5,6-dihydromorphanthridine,
5-thiobutylcarbonyl-5,6-dihydromorphanthridine.

The oxidation of the 5-acyl-5,6-dihydromorphanthridines to the 5-acyl-5,6-dihydro-11-morphanthridones may be readily effected by treating them with an oxidizing agent such as chromium trioxide in a mineral acid. Other suitable oxidizing agents which may be employed are an alkali metal bichromate, potassium permanganate, or hydrogen peroxide.

Examples of some of the 5-acyl-5,6-dihydro-11-morphanthridones which may be prepared in this manner are:

5-acetyl-5,6-dihydro-11-morphanthridone,
2-chloro-5-acetyl-5,6-dihydro-11-morphanthridone,
2-trifluoromethyl-5-propionyl-5,6-dihydro-11-morphanthridone,
3-methyl-5-butyryl-5,6-dihydro-11-morphanthridone, and
5-benzoyl-5,6-dihydro-11-morphanthridone.

The 5 - acyl - 5,6 - dihydro - 11 - morphanthridones are treated with hydroxylamine to convert them to the corresponding oximes. The reaction is preferably carried out in an organic medium in which the reactants are soluble. The hydroxylamine is preferably produced in situ by the neutralization of a hydroxylamine salt such as the hydrochloride. Inorganic bases such as the alkali metal hydroxides, acetates, carbonates and bicarbonates, as well as organic bases such as pyridine, may be employed to neutralize the acid released from the hydroxylamine salt.

Lower alcohols such as ethanol and isopropanol, as well as other organic solvents in which the reactants are soluble, such as tetrahydrofuran, may be used in the reaction mixture. The reaction is promoted by the use of moderately elevated temperatures with the reflux temperature being particularly suitable. The reaction proceeds rather slowly, but is usually substantially complete in up to or slightly more than 50 hours. When the reaction is terminated, the reaction mixture can be chilled with ice water, extracted with ether and the final product crystallized from a solvent such as acetonitrile.

Examples of some of the 5-acyl-5,6-dihydro-11-morphanthridone oximes which may be prepared by the described process are:

5-acetyl-5,6-dihydro-11-morphanthridone oxime,
2-chloro-5-acetyl-5,6-dihydro-11-morphanthridone oxime,
2-trifluoromethyl-5-propionyl-11-morphanthridone oxime, 3-methyl-5-butyryl-5,6-dihydro-11-morphanthridone oxime,
5-benzoyl-5,6-dihydro-11-morphanthridone oxime, and
5-benzenesulfonyl 5,6-dihydro-11-morphanthridone oxime.

The 5-acyl-5,6-dihydro-11-morphanthridone oximes of the present invention as well as their pharmaceutically acceptable salts are promising anti-hypertensive agents. The compounds may be administered to animals as the pure compounds or in the form of pharmaceutically acceptable nontoxic salts. However, to obtain a more practical size to dosage relationship, one or more of the compounds is generally combined with a suitable pharmaceutical carrier and made into unit dosage forms. These dosage forms may be particularly adapted for either oral or parenteral administration.

Pharmaceutical carriers which are either liquid or solid may be employed. The preferred liquid carrier is water. However, in the event the compound is not soluble or miscible in water, an organic solvent such as ethylene glycol may be employed. Flavoring materials may be included if desired.

Solid pharmaceutical carriers such as starch, sugar and talc can be utilized to form powders. These powders can be used as such or can be tableted or used to fill gelatin capsules. Suitable lubricants such as magnesium stearate, binders such as gelatin and disintegrating agents such as sodium carbonate in combination with citric acid may be employed in the formation of the tablets.

The following examples are presented to illustrate this invention:

EXAMPLE I

*5-acetyl-5,6-dihydro-11-morphanthridone oxime*

A mixture of 0.02 mole of 5-acetyl-5,6-dihydro-11-morphanthridone, 0.05 mole of hydroxylamine hydrochloride and 50 ml. of pyridine is stirred and held at reflux for 50 hours. The pyridine is distilled in vacuo, the residue poured into ice and water, the resulting oil extracted with chloroform and washed with water, 10% aqueous hydrochloric acid, and water, and dried over sodium sulfate. The solution is filtered and concentrated to leave an orange solid, M.P. 98–112°, which on repeated crystallizations from acetonitrile gives 5-acetyl-5,6-dihydro-11-morphanthridone oxime, M.P. 222–224° C.

*Analysis.*—Calcd. for $C_{16}H_{14}N_2O_2$: C, 72.13; H, 5.31; N, 10.52. Found: C, 72.09; H, 5.24; N, 10.55.

EXAMPLE II

*2-chloro-5-acetyl-5,6-dihydro-11-morphanthridone oxime*

The procedure of Example I is repeated except that 2-chloro-5-acetyl-5,6-dihydro-11-morphanthridone is employed in place of 5-acetyl-5,6-dihydro-11-morphanthridone. The product obtained is 2-chloro-5-acetyl-5,6-dihydro-11-morphanthridone oxime.

EXAMPLE III

*5-benzoyl-5,6-dihydro-11-morphanthridone oxime*

The procedure of Example I is repeated except that 5-benzoyl-5,6-dihydro-11-morphanthridone is employed in place of 5-acetyl-5,6-dihydro-11-morphanthridone and the product which is obtained is 5-benzoyl-5,6-dihydro-11-morphanthridone oxime.

We claim:
1. A compound of the formula

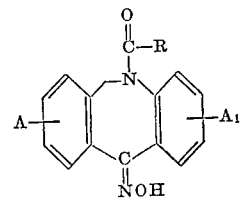

in which A and $A_1$ are members selected from the group consisting of hydrogen, halogen, lower alkoxy, lower alkyl, thio-lower alkyl and trifluoromethyl, and R is a member selected from the group consisting of lower alkyl, benzyl and phenyl, O-lower alkyl and S-lower alkyl.

2. 5-acetyl-5,6-dihydro-11-morphanthridone oxime.
3. 2 - chloro - 5 - acetyl - 5,6 - dihydro - 11 - morphanthridone oxime.
4. 5-benzoyl-5,6-dihydro-11-morphanthridone oxime.

References Cited

Wagner et al.: Synthetic Organic Chemistry (New York, 1953), page 739.
Winthrop et al.: J. Med. Pharm. Chem., vol. 5, pp. 1199, 1201 and 1206.

ALTON D. ROLLINS, *Primary Examiner.*